Dec. 15, 1936.  H. E. BLECKER  2,064,408
FISHING APPARATUS
Filed Nov. 22, 1933  3 Sheets-Sheet 1
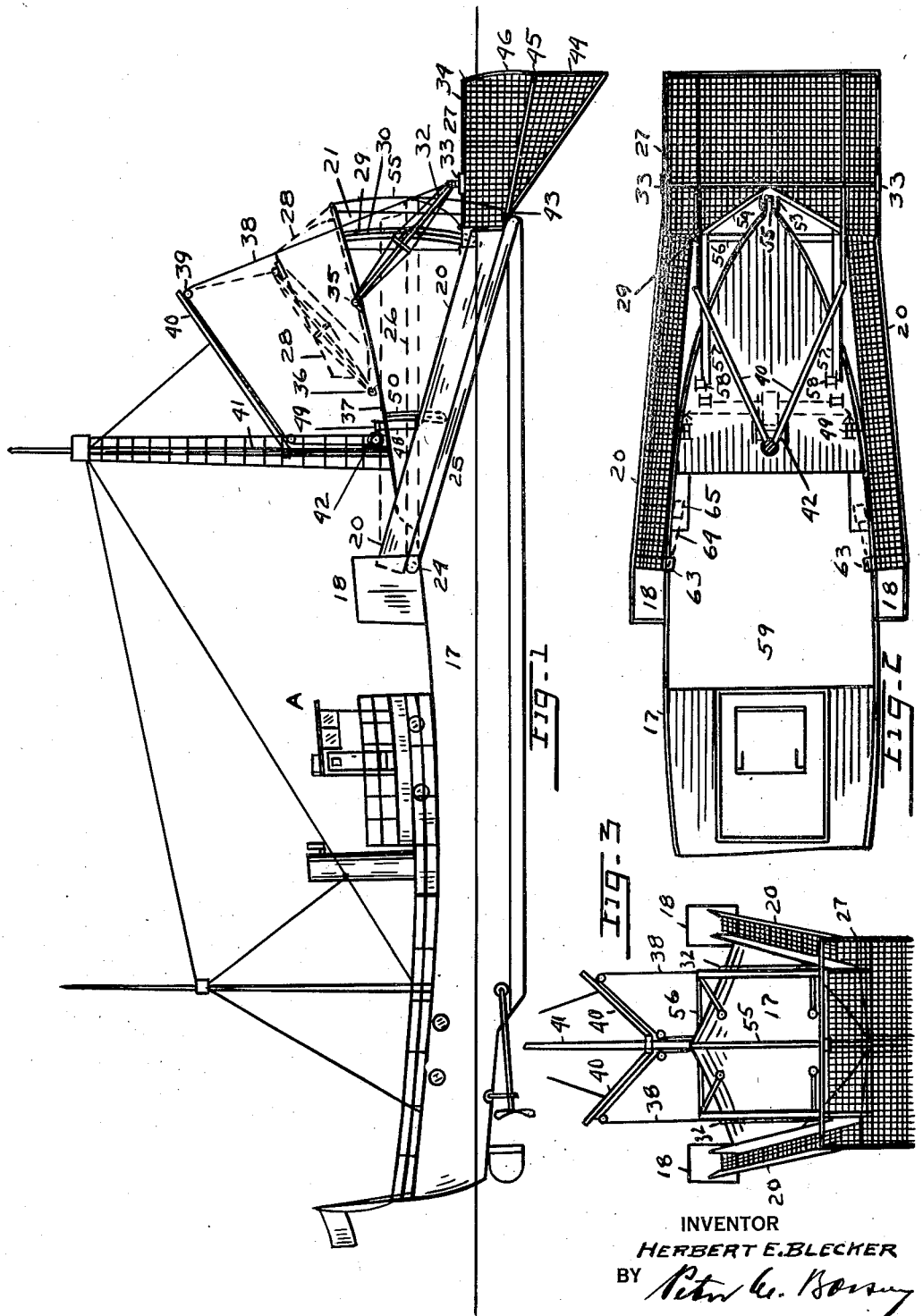
INVENTOR
HERBERT E. BLECKER
BY
ATTORNEY Dec. 15, 1936.  H. E. BLECKER  2,064,408
FISHING APPARATUS
Filed Nov. 22, 1933   3 Sheets-Sheet 2
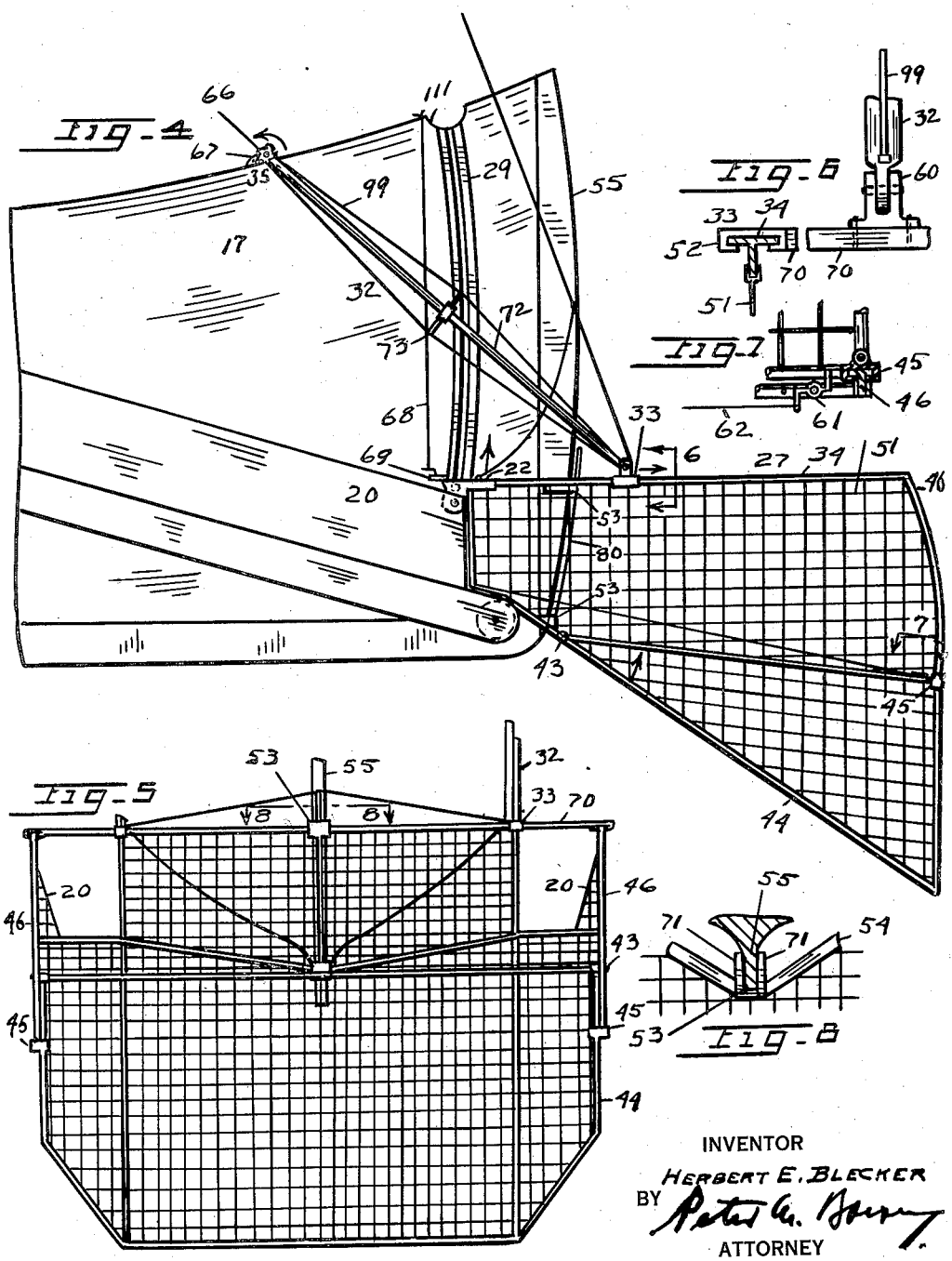
INVENTOR
HERBERT E. BLECKER
BY
ATTORNEY Dec. 15, 1936.                H. E. BLECKER                2,064,408
                             FISHING APPARATUS
                          Filed Nov. 22, 1933          3 Sheets-Sheet 3
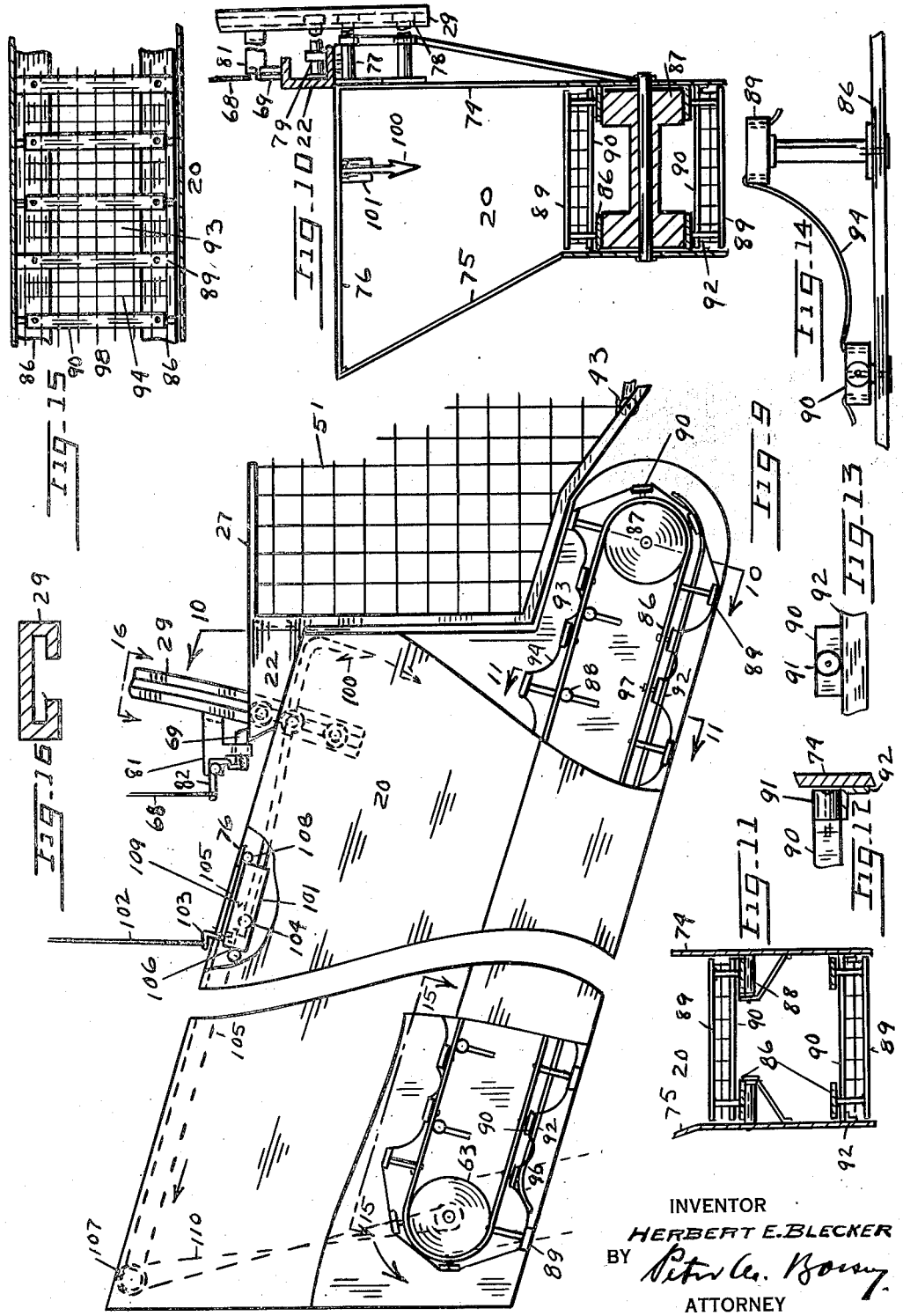
INVENTOR
*HERBERT E. BLECKER*
BY
ATTORNEY Patented Dec. 15, 1936

2,064,408

UNITED STATES PATENT OFFICE 2,064,408

FISHING APPARATUS

Herbert E. Blecker, New York, N. Y.

Application November 22, 1933, Serial No. 699,209

7 Claims. (Cl. 43—4)

This invention relates to fishing apparatus and particularly to correlated mechanical elements which may be installed in connection with a ship, or vessel of a suitable character.

The principal object of the invention is to provide means for capturing or gathering fish and conveying them to receiving stations on the vessel from which they may be loaded or distributed within those portions of the hull which are set apart for cargo carrying, or for dressing and preparing the fish in any required manner.

A vessel equipped with this apparatus could be used, either for taking fish for food purposes, or for catching large species such as sharks which would be skinned and the hides treated for preservation and to be finally converted into leather. The leather produced from shark skins has many highly desirable qualities such as toughness, durability, and the like and is susceptible to finishes of great beauty and attractiveness.

Another use for vessels thus equipped is that of taking cheaply and quickly large quantities of fish such as menhaden which are used for the manufacture of fertilizer.

Some of the novel features of the apparatus are as follows: A scoop net adjustably mounted on the bow portion of a vessel and projecting forwardly therefrom partially submerged, and liftable from this position to the deck of the vessel and foldable to rest thereon securely when not in use. A feature of the net is a means thereon for slidably securing the same in position relative to the hull, further means being provided for bracing and rigidly supporting it against the force of heavy sea waves and floating debris such as would be occasionally encountered.

Another feature of the apparatus is a pair of conveying chutes which lead from the net to the receiving stations of the ship. These chutes being liftable independently of the net and having means for support along the sides of the vessel below the deck line when not locked in operative positions relative to the net.

The chutes are further provided with a highly novel and efficient conveying means consisting of belts passing over rollers and having an open area between them, and with cross elements set at varying heights to form pockets of meshed strands, or cordage. The conveyors, because of their open construction, offer little resistance in the submerged portions and immediately drain free of water as soon as they pass out of the same.

The foregoing and other objects and features of the invention are fully set forth and described in the following specification and claims, and illustrated in the accompanying drawings, in which:

Fig. 1 shows a side view of a vessel equipped with the apparatus which is the subject of the invention.

Fig. 2 shows a partial deck plan of the vessel with the net and conveying chutes.

Fig. 3 shows a bow elevation looking rearwardly at the ship and apparatus.

Fig. 4 shows an enlarged side view of a portion of the ship's hull with the scoop net in operative position and locked over a conveyor chute.

Fig. 5 is a front elevation of the net drawn on the same scale as Figure 4.

Fig. 6 is a greatly enlarged fragmentary view of a slide element on the net frame, and the lower end of a side beam which is a part of the reinforcing structure of the net assembly. This view being on the line 6 of Figure 4.

Fig. 7 is a top plan view of the locking means which secures the folding portion of the scoop net in operative position. This view is on the line 7 of Figure 4.

Fig. 8 is a fragmentary top plan view of a sliding guide block of the net in position engaging the bow stem of the vessel.

Fig. 9 is a further enlarged fragmentary view of a conveyor chute with the net locked thereon in an arc guide. The walls are broken away to disclose the conveyor belts and also an auxiliary pulling element and hook.

Fig. 10 is a section on the line 10—10 of Figure 9 and shows a front view of a chute casing locked to an arc guide and showing a cross section of the conveyor belts and net pockets.

Fig. 11 is a cross section of the lower portion of a chute taken on the line 11—11 of Figure 9, and showing the conveyor belts, cross elements, and net pockets.

Fig. 12 is an enlarged fragmentary front view of an end of a cross element with a roller thereon resting on a side track attached to the wall of the chute.

Fig. 13 is an end view of the cross element shown in Figure 12 with the roller resting on the side track.

Fig. 14 is a fragmentary view of the edge of a belt with cross elements thereto attached and mesh strands connecting the said cross elements to form a pocket.

Fig. 15 is a fragmentary top plan view of the conveyor belts and cross elements and net pockets as seen on the line 15—15 of Figure 9.

Fig. 16 is a cross section—greatly enlarged—of and arc guide element as on the line 16 of Figure 9.

Referring now to Figure 1 of the drawings, the vessel A has a hull 17 on which receiving stations 18 are mounted at the sides in line with the chutes 20. The chutes are pivotally supported at 24 and may be lifted from their positions 25 to their horizontal positions as indicated by the dotted lines 26. The scoop net 27 is slidably mounted at the bow 21 of the vessel, it being shown in operative location in this view. It is liftable in advance of the conveyor chutes 20 to a position above the deck line and may be retracted or slid back and folded so as to be stowed as indicated by the dotted lines 28. The net may, if desired, be lifted independently of the chutes or simultaneously, as preferred. Arc guide elements 29 having slots 30 are attached to the hull 17, and the scoop net has members which engage and slide within the said arc elements. Side beams 32 are connected with slide elements 33 which are movably mounted on the frame 34 of the net. These side beams have their opposite ends pivotally mounted on traveler members 35 which are locked when in operative position and are movable back to the points indicated at 36 when the net is being carried on the deck 37. However, any well known means can be used to permit the rearward and forward movement of the traveler members 35, and for locking them in operative position, and this construction is not claimed as part of my invention. The net 27 is lifted from its operative position by means of the cables 38 which run through sheaves 39 on the booms 40, which are carried on the mast 41 and project forwardly in a V-formation. The cables are operated by the drum 42 which is driven by connection to engines—not shown. The net is foldable from the pivot joints 43, and the lower element 44 has lugs 45 which slide on the curved side frames 46.

The chutes are liftable by the cables 48 and the drums 49 and are supported in their mid portions by the auxiliary arc guides 50.

Referring now to Figure 2, center guide blocks 53 are mounted on the rear frame 54 of the net and engage the bow stem 55 of the hull. The arc guide elements 29 are offset from the hull and are supported by the frame bars 56. Deck tracks 57 run back from the arc guides and the net travels on these when it is lifted and retracted as is done when the vessel is loaded and ready for returning to its port of delivery. Drums 58 operate cables—not shown—which are attached to the net when in raised position, for the purpose of retracting it.

The hold 59 is, preferably, open as shown and the fish are dumped into it from the receiving stations 18. The drive rollers 63 are operated by chain drives 64 and engines as indicated at 65. Other drive connections may be provided if preferred.

In Figure 4 an enlarged view shows the bow of the vessel. In this view the net 27 is shown to have rear guide lugs as seen at 22 which engage the arc guide elements 29 and are locked over the conveyor chutes 20. The frames of the net 27 have mesh strands 51 attached as shown. The slide elements 33 are mounted on the frames and are constructed as shown in Figure 6. The upper frame 34 is of T-form and the slide elements have overlapping side members 52. The lateral bar 70 has pivoted attachments 69 connected to the side beams 32.

The folding net portion 44—see Figure 4—is pivoted at 43 and is slidable in the lugs 45 on the curved frames 46, as previously described. In Figure 7 a plan view shows a lug 45 engaging the frame 46. A latch 61 locks the elements in position and is releasable by the cable 62.

In Figure 4 the center guide blocks 53 are shown connected by the member 80. The form of these guide blocks is illustrated in Figure 8. The side elements 71 are shown in contact with the stem 55.

The side beams 32—see Figure 4—may be of any form, but the preferred construction is as shown in this view. The main bar 72 has a transverse brace 73 from which guy rods 99 pass to points of attachment at the extremities of the beam. Ratchets 66 at the ends of the beams are locked by pawls 67 when the net is lowered into operative position. The latch cable 68, seen in this view, operates a bolt 69 to lock the net. The recess 111 over the arc guide 29 is for the purpose of directing the element 22 into the said guide when the net is to be lowered.

Referring now to Figure 10, the chute 20 has one straight side 74 and one side 75 flared outwardly. Cross bars 76 are positioned at intervals on the side walls. The chutes on both sides of the vessel are similar and that shown in this view has stud bars 77 which pass into the arc guide 29 and have button heads 78 as shown. The guide lug 22 has a stud 79 which engages the arc guide in the same way as the studs 77. The manner in which the guide lugs are locked is shown in Figure 9 where it will be seen that the bolts as shown at 69 engage the lugs. These bolts are supported on the brackets 81 which are mounted on the arc guides 29, the release being by means of the L-members 82 and the pull cables 68.

The conveyor belts 86—see Figures 9, 10 and 11—are carried on drive rollers 63 and free rollers 87. These belts are, preferably, of the rubber and fabric variety and well adapted to operate in water both efficiently and quietly. Means —not shown—may be provided to regulate the tension of the belts. The belts are supported along the sides of the chutes by a series of rollers 88 over which they travel. Cross elements 89 and 90, which may be of wood or any suitable material are secured at intervals to the belts in such a way as to avoid buckling when the belts are passing over the rollers.

The cross elements 89 and 90 are placed at varying heights from the belts and are of two varieties. The high elements 89 extend clear across to the sides of the chutes, but the elements 90 are shorter and have rollers 91—see Figure 12—at their extremities. These rollers are for the purpose of supporting the belts on their downward passage to prevent sagging, and they travel upon side tracks 92 which are attached to the walls of the chutes. Pockets 93— see Figure 9—are formed between the high cross elements by the strands of net 94 which are attached to them and to the low elements as shown, being loose enough to permit of the spreading of the cross elements when passing around the end rollers. A plan view of the belts and net pockets is shown in Figure 15. The space 98 between the belts being open except for the strands 94 which extend across the area. The side tracks 92—see Figure 9—are curved at 96 to pick up the rollers of the cross elements. The binding plates 97 back of the cross elements serve to increase the gripping power of the belts on the drive rollers. The rollers 63 may have cleats to engage the plates 97 if desired.

The apparatus is adaptable for taking small fish and also for capturing sharks of large proportions. When large sharks are caught, they are generally too big to be carried readily by the conveyor pockets, to meet such contingency cross elements are made to engage portions of the sharks such as fins and the like. An auxiliary pulling apparatus is therefore provided to work in correlation with the conveyor belts, or it may work independently if preferred. These auxiliary devices—see Figure 9—consist of the gaff hooks 100 which are ordinarily held in suspension by the traveler boxes 101.

The gaff hooks 100 are released by pulling the cables 102 which throw the latches 103 which bear on the base ends of the hooks, the hooks being pivotally attached at 104. The traveler boxes have cables 105 attached at 106 and these cables pass around the drive pulleys 107 and back to the pulleys 108 and around these to points of attachment at the other ends of the boxes. The pulleys 108 being supported on the cross bars 76 as shown. Springs 109 give additional force to the gaff hooks when they are released to drive into the heads of sharks which have been brought into the mouths of the conveyor chutes. The sharks are killed while in the scoop net to prevent thrashing in the conveyors. The drive pulleys 107 are actuated by chains 110 which are operated from the main drive rollers 63, or by independent means if desired.

The apparatus has been shown and described in its preferred form, but may be constructed with minor changes in detail without departure from the spirit or scope of the appended claims.

Having thus described the invention, what is claimed as new and desired to be secured by Letters Patent of the United States, is as follows:

1. In combination with a ship, a scoop net mounted thereon and extending, when in operative position, in advance thereof, the said net consisting of side frames having curved forward portions, a bottom element pivotally attached at the rear of the net proper and foldable by the sliding of its forward frame members on the curved portions of the side frames, slide elements mounted on the upper members of the net and connected to a lateral bar which has pivotal attachments to which are connected side beams, these side beams extending to points of pivotal attachment on the ship proper, and having locking means in connection therewith, and the said beams having their attachment elements to the ship slidable to secondary positions thereon, means to lock the foldable portion of the net, and means to lift the net and to retract the same to a stowed position on the deck of the aforesaid ship.

2. In combination with a ship chutes mounted on the sides thereof and in alignment with a scoop net mounted on the said ship, the said chutes each having a drive roller and a free roller and conveyor belts mounted on the said rollers, cross elements attached to the said belts and set at varying heights with respect thereto and connected by mesh strands to form carrying pockets, some of the cross elements extending fully across the space within the chutes, and other cross elements having rollers on their extremities which contact on lower guide tracks as portions of the belts pass under the drive rollers, and thus prevent any sagging of the belts when on their lower courses, auxiliary rollers mounted at intervals within the chutes and set to support the upward moving belts, and means to operate the said drive rollers and to move the aforesaid belts.

3. In combination with a ship, side chutes pivotally suspended on the sides thereof and aligned to receive material from a scoop net mounted on the bow of the ship, main arc elements offset on the hull of the ship and the said chutes and net all slidably engaging the said arc elements and having means to lock the whole in operative position, auxiliary arc elements set on the hull of the ship in positions intermediate the pivotal mountings and the main arc elements, conveying means in the said chutes, means to actuate the same and means to lift the chutes to horizontal positions, and means to lift the net and to stow the same above the deck line of the ship.

4. In combination with a ship, a scoop net mounted thereon and aligned with chutes on the said ship, conveying elements within the said chutes and auxiliary pulling means consisting of gaff hooks mounted in traveler boxes and releasable to drop into operative positions, the said traveler boxes removable by means of elements operable by connection with the drive means which actuates the conveying elements of the aforesaid chutes.

5. In combination with a ship having a scoop net thereon and side chutes aligned therewith, gaff hooks mounted in traveler boxes which have latches to lock the hooks in positions of rest and are releasable by means extending to points of access on the ship, and means to operate the said traveler boxes to draw the said gaff hooks upwardly along the lines of the aforesaid chutes.

6. In combination with a ship, a scoop net constructed with side portions and a foldable bottom, and having stud connections for mounting the latter on the bow of a ship, arc elements offset on the hull of the ship and adapted to engage said studs, guiding slide blocks forming part of the net structure and being in contact with the bow of the ship, chutes formed upon the sides of the latter, said net being aligned to deliver into the side chutes, and having means to lock the said chutes together wih the net structure, when in operative position.

7. In combination with a ship, a scoop net mounted on the bow portion thereof and extending forwardly with respect thereto when in operative position, the said net being aligned to discharge into the mouths of side chutes on the ship, arc elements disposed at the point of conjunction of the net and chutes and adapted to permit the sliding of said net in withdrawing the latter for folding upon the deck, said arc elements being attached to the hull and being provided with slots therein, means arranged upon the scoop net and adapted to slide within said arc element slots, side beams, and slide elements connected to the latter, said slide elements being movably mounted on the frame of said net.

HERBERT E. BLECKER.